United States Patent
Kela et al.

(10) Patent No.: US 10,499,241 B2
(45) Date of Patent: Dec. 3, 2019

(54) ASSIGNING MULTIPLE RADIO NETWORK TEMPORARY IDENTIFIERS TO A USER DEVICE

(71) Applicant: Huawei Technologies Co., Ltd., Shenzhen (CN)

(72) Inventors: Petteri Kela, Helsinki (FI); Henrik Lundqvist, Kista (SE); Henrik Olofsson, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/408,071

(22) Filed: Jan. 17, 2017

(65) Prior Publication Data

US 2017/0127272 A1  May 4, 2017

Related U.S. Application Data

(63) Continuation of application No. PCT/EP2014/065490, filed on Jul. 18, 2014.

(51) Int. Cl.
| | |
|---|---|
| *H04W 8/26* | (2009.01) |
| *H04W 24/02* | (2009.01) |
| *H04W 76/27* | (2018.01) |
| *H04W 36/18* | (2009.01) |
| *H04W 76/11* | (2018.01) |

(52) U.S. Cl.
CPC ............ *H04W 8/26* (2013.01); *H04W 24/02* (2013.01); *H04W 36/18* (2013.01); *H04W 76/11* (2018.02); *H04W 76/27* (2018.02)

(58) Field of Classification Search
CPC ............................... H04W 8/26; H04W 24/02
See application file for complete search history.

(56) References Cited

U.S. PATENT DOCUMENTS

| | | | |
|---|---|---|---|
| 2009/0005127 A1* | 1/2009 | Frenger ................. | H04W 52/28 455/574 |
| 2010/0105404 A1 | 4/2010 | Palanki et al. | |
| 2010/0238909 A1 | 9/2010 | Kim | |
| 2013/0070722 A1* | 3/2013 | Li ......................... | H04L 5/0003 370/329 |

(Continued)

FOREIGN PATENT DOCUMENTS

| | | |
|---|---|---|
| CN | 101909360 A | 12/2010 |
| CN | 102387593 A | 3/2012 |

(Continued)

*Primary Examiner* — Yaotang Wang
(74) *Attorney, Agent, or Firm* — Slater Matsil, LLP

(57) ABSTRACT

A user device is provided. The user device comprises a transceiver configured to: receive a first Radio Network Temporary Identifier (RNTI), wherein the first RNTI is valid for a first set of network nodes of a radio communication network; receive at least one second RNTI, wherein the second RNTI is valid for a second set of network nodes of the radio communication network, and wherein the first set of network nodes and the second set of network nodes are different sets of network nodes; transmit data to the radio communication network, or receive data from the radio communication network, using the first RNTI or the second RNTI. Furthermore, a network node and corresponding methods, a computer program, and a computer program product are provided.

17 Claims, 9 Drawing Sheets

(56) References Cited

U.S. PATENT DOCUMENTS

| | | | |
|---|---|---|---|
| 2013/0155981 A1* | 6/2013 | Kitazoe | H04W 8/26 370/329 |
| 2013/0195030 A1* | 8/2013 | Wittberg | H04W 72/0446 370/329 |
| 2013/0288720 A1* | 10/2013 | Takano | H04W 68/02 455/458 |
| 2014/0044079 A1 | 2/2014 | Sågfors et al. | |
| 2014/0066075 A1 | 3/2014 | Chun et al. | |
| 2014/0286243 A1* | 9/2014 | Yamada | H04W 76/025 370/329 |
| 2015/0043455 A1* | 2/2015 | Miklos | H04W 8/26 370/329 |
| 2015/0245386 A1* | 8/2015 | Uchino | H04W 74/02 370/329 |
| 2016/0302124 A1* | 10/2016 | Morita | H04W 16/08 |

FOREIGN PATENT DOCUMENTS

| | | |
|---|---|---|
| CN | 103888963 A | 6/2014 |
| CN | 103906043 A | 7/2014 |
| RU | 2421910 C2 | 6/2011 |
| RU | 2496261 C2 | 10/2013 |
| WO | 2007052968 A1 | 5/2007 |
| WO | 2010048563 A1 | 4/2010 |
| WO | 2013102489 A1 | 7/2013 |

\* cited by examiner

ASSIGNING MULTIPLE RADIO NETWORK TEMPORARY IDENTIFIERS TO A USER DEVICE

CROSS-REFERENCE TO RELATED APPLICATIONS

This application is a continuation of International Application No. PCT/EP2014/065490, filed on Jul. 18, 2014, the disclosure of which is hereby incorporated by reference in its entirety.

TECHNICAL FIELD

The present invention relates to a user device and a network node for wireless communication systems. Furthermore, the present invention also relates to corresponding methods, a computer program, and a computer program product.

BACKGROUND

Future communication networks are getting more heterogeneous and more dense base station deployment will be used for handling increasing cellular network capacity needs.

Hence, handling seamless mobility between Access Nodes (ANs) will be one key issue in the future, where communication networks are becoming more and more user centric.

Also different types of new data transmission schemes are visualized for the future communication system. Users could for example be able to send small amounts of data without connection or with contention based manner during idle mode. These would require new user identification methods.

Currently, communication networks based on 3GPP standards use Cell Radio Network Temporary Identifier (C-RNTI) to identify a User Equipment (UE) connected to a cell. When handover procedure has been performed or Radio Resource Connection (RRC) connection is re-established, the UE needs to do Random Access (RA) procedure for getting a valid C-RNTI.

In Long Term Evolution (LTE) there also exist other RNTI types. This is also the case in Universal Mobile Telecommunications Systems (UMTS) where there are multiple RNTI types for different purposes, and some of them have different scopes. For example, the cell RNTI is valid in a cell, the S:RNTI is valid in the scope of the serving Radio Network Controller (RNC) and the User-RNTI (U-RNTI) is unique in the whole Universal Terrestrial Radio Access Network (UTRAN) since it consists of a random RNTI for the UE and serving RNC Identity (ID).

When the UE is in idle mode the UE is identified with a Temporary Mobile Subscriber Identity (TMSI), which is valid in a larger area but is only used for idle mode procedures such as paging of UEs and service request.

SUMMARY

An objective of embodiments of the present invention is to provide a solution which mitigates or solves the drawbacks and problems of conventional solutions.

According to a first aspect of the invention, the above mentioned and other objectives are achieved with a user device for a wireless communication system. The user device comprises a transceiver configured to receive a first Radio Network Temporary Identifier, RNTI, wherein the first RNTI is valid for a first set of network nodes of a radio communication network. The transceiver is also configured to receive at least one second RNTI, wherein the second RNTI is valid for a second set of network nodes of the radio communication network, and wherein the first set of network nodes and the second set of network nodes are different sets of network nodes. The transceiver is also configured to transmit data to the radio communication network, or receive data from the radio communication network, using the first RNTI or the second RNTI.

It is understood that first set of network nodes and the second set of network nodes are different sets of network nodes which means that the sets are not identical sets. The first set and the second set have to differ with at least one element (i.e. network node) from each other. It should further be understood that the term "set" is the mathematical meaning implying that a set can have one element only, hence the first and the second sets may comprise only one network node each.

It is also to be noted that the user device may receive more than one second RNTI. The second RNTIs may each be associated with different second sets of network nodes.

The user device according to the first aspect receiving and using the first RNTI or the second RNTI means that the radio communication network can control which RNTIs are using, and therefore allocate the available identifiers in an efficient way to accommodate many user devices within a limited address space. Thereby, efficient management of RNTI address space is possible, e.g. over large coverage areas.

Furthermore, the user device according to the first aspect enables smoother and faster handovers and other mobility issues without RNTI acquisition process.

Moreover, the user device according to the first aspect enables user device centric mobility handling which means smoother mobility between network nodes in the future and in currently existing wireless communication systems, such as LTE and UMTS.

In a first possible implementation form of a user device according to the first aspect as such, the transceiver is further configured to: receive the first RNTI and the second RNTI from the radio communication network in a single radio signal or in separate radio signals.

The first possible implementation form of the first aspect has the advantages that the network node may signal the RNTIs to the user device in an efficient way, where it may sometimes be more efficient to signal both RNTIs in the same signal and sometimes it may be more efficient to signal them separately.

In a second possible implementation form of a user device according to the first implementation form of the first aspect or the first aspect as such, the second RNTI is the first RNTI with an address space extension.

The second possible implementation form of the first aspect has the advantage that the structuring of the address is easier for the assignment of the RNTIs. The first RNTI is shorter than the second RNTI.

In a third possible implementation form of a user device according to the second implementation form of the first aspect, the address space extension is a common identity for the second set of network nodes.

The third possible implementation form of the first aspect has the advantage that RNTIs are reused in a way that is simple to manage for the radio communication network, since the radio communication network can identify the set of network nodes in which a RNTI is valid.

In a fourth possible implementation form of a user device according to any of the implementation forms of the first aspect or the first aspect as such, the transceiver is further configured to: start transmitting data to the radio communication network using the first RNTI, and transmit data to the radio communication network instead using the second RNTI if transmitting data to the radio communication network using the first RNTI fails.

The fourth possible implementation form of the first aspect has the advantages that the first RNTI is always used for data transmission if possible. Additionally, as the first RNTI maybe be shorter than the second RNTI, the user device may use a short RNTI for data transmission during normal communication, and use a long RNTI only when it is needed, for example if the user device is no longer within the coverage of the first set of network nodes.

In a fifth possible implementation form of a user device according to any of the implementation forms of the first aspect or the first aspect as such, the use of the first RNTI or the second RNTI are given by RNTI selection rules.

The fifth possible implementation form of the first aspect has the advantage that the usage of the RNTIs may be optimized in the user device according to different selection criteria.

In a sixth possible implementation form of a user device according to the fifth implementation form of the first aspect, the user device further comprises a processor configured to provide the RNTI selection rules, or wherein the transceiver is further configured to receive a RNTI control message from the radio communication network comprising the RNTI selection rules; and wherein the transceiver is further configured to: transmit data to the radio communication network, or receive data from the radio communication network, using the first RNTI or the second RNTI according to the RNTI selection rules.

The sixth possible implementation form of the first aspect has the advantage that the RNTI selection rules may be given in the user device for fast RNTI selection or updated and controlled by the radio communication network.

In a seventh possible implementation form of a user device according to the fifth or the sixth implementation form of the first aspect, the RNTI selection rules for using the first RNTI or the second RNTI are dependent on one or more parameters in the group comprising: geographic location of the user device; serving network node identity; detected neighbour network nodes; type of assigned radio communication channel; length of sleep periods in discontinuous reception; mobility for the user device; type of protocol message, type of transmission, and RNTI communication failure.

The seventh possible implementation form of the first aspect has the advantage that the RNTI selection can be adapted to the requirements of a specific user device. For example, the user device may use the second RNTI if the user device has high mobility, or long sleep periods, since this increases the probability that the user device will leave the first set of network nodes where the first RNTI can be used (is valid).

In an eighth possible implementation form of a user device according to any of the implementation forms of the first aspect or the first aspect as such, the first set of network nodes is a subset of the second set of network nodes.

The eight possible implementation form of the first aspect has the advantage that it is simpler for the radio communication network to manage the usage of RNTIs and the mobility of the user devices.

According to a second aspect of the invention, the above mentioned and other objectives are achieved by a network node for a radio communication network, the network node comprising a transceiver and a processor. The processor is configured to assign a first Radio Network Temporary Identifier, RNTI, to a user device, wherein the first RNTI is valid for a first set of network nodes of the radio communication network. The processor is also configured to assign at least one second RNTI to the user device, wherein the second RNTI is valid for a second set of network nodes of the radio communication network, and wherein the first set of network nodes and the second set of network nodes are different sets of network nodes. The transceiver is configured to signal the first RNTI to the user device, and signal the second RNTI to the user device.

The network node according to the second aspect assigning and signalling the first RNTI and the second RNTI to the user device means that the radio communication network can control which RNTIs are using, and therefore allocate the available identifiers (RNTIs) in an efficient way to accommodate many user devices within a limited address space. Thereby, efficient management of RNTI address space is possible, e.g. over large coverage areas.

Furthermore, the network node according to the second aspect enables smoother and faster handovers without RNTI acquisition process.

Moreover, the network node according to the second aspect enables user device centric mobility handling which means smoother mobility between network nodes in the future and in currently existing cellular systems such as LTE and UMTS.

In a first possible implementation form of a network node according to the second aspect as such, the transceiver is further configured to transmit data to the user device, or receive data from the user device, using the first RNTI or the second RNTI for identifying the user device.

The first possible implementation form of the second aspect has the advantage that either the first RNTI or the second RNTI can be used in both uplink and downlink communications.

In a second possible implementation form of a network node according to the first implementation form of the second aspect or the second aspect as such, the transceiver is further configured to signal the first RNTI and the second RNTI to the user device in a single radio signal or in separate radio signals.

It is noted that the second RNTI can be the first RNTI with an address space extension. Further, the address space extension may be a common identity for the second set of network nodes.

The second possible implementation form of the second aspect has the advantage that the network node may signal the RNTIs to the user device in an efficient way, where it may sometimes be more efficient to signal both RNTIs in the same signal and sometimes it may be more efficient to signal them separately.

In a third possible implementation form of a network node according to any of the implementation forms of the second aspect or the second aspect as such, the transceiver is further configured to signal a RNTI control message to the user device, wherein the RNTI control message comprises RNTI selection rules whether the user device should use the first RNTI or the second RNTI.

In a fourth possible implementation form of a network node according to any of the implementation forms of the second aspect or the second aspect as such, the RNTI selection rules for using the first RNTI or the second RNTI are dependent on one or more parameters in the group comprising: geographic location of the user device; serving network node identity; detected neighbour network nodes;

type of assigned radio communication channel; length of sleep periods in discontinuous reception; mobility for the user device; type of protocol message, type of transmission, and RNTI communication failure.

The network node may be a central controller network node or a distributed controller network node of a radio communication network for handling RNTIs.

The third possible implementation form of the second aspect has the advantage that the RNTI selection rules may be controlled and updated by the radio communication network.

According to a third aspect of the invention, the above mentioned and other objectives are achieved by a method in a user device for a wireless communication system. The method comprises receiving a first Radio Network Temporary Identifier, RNTI, wherein the first RNTI is valid for a first set of network nodes of a radio communication network. The method also comprises receiving at least one second RNTI, wherein the second RNTI is valid for a second set of network nodes of the radio communication network, and wherein the first set of network nodes and the second set of network nodes are different sets of network nodes. The method also comprises transmitting data to the radio communication network, or receiving data from the radio communication network, using the first RNTI or the second RNTI.

In a first possible implementation form of the method according to the third aspect as such, the method further comprises receiving the first RNTI and the second RNTI from the radio communication network in a single radio signal or in separate radio signals.

In a second possible implementation form of the method according to the first implementation form of the third aspect or the third aspect as such, the second RNTI is the first RNTI with an address space extension.

In a third possible implementation form according to the second implementation form of the method according to the third aspect, the address space extension is a common identity for the second set of network nodes.

In a fourth possible implementation form of the method according to any of the implementation forms of the third aspect or the third aspect as such, the method further comprises start transmitting data to the radio communication network using the first RNTI, and transmitting data to the radio communication network instead using the second RNTI if transmitting data to the radio communication network using the first RNTI fails.

In a fifth possible implementation form of the method according to any of the implementation forms of the third aspect or the third aspect as such, the method further comprises using the first RNTI or the second RNTI according to RNTI selection rules.

In a sixth possible implementation form according to the fifth implementation form of the method according to the third aspect, the method further comprises receiving a RNTI control message from the radio communication network comprising the RNTI selection rules. The transceiver is further configured to transmit data to the radio communication network, or receive data from the radio communication network, using the first RNTI or the second RNTI according to the RNTI selection rules.

In a seventh possible implementation form according to the fifth or the sixth implementation form of the method according to the third aspect, the RNTI selection rules for using the first RNTI or the second RNTI are dependent on one or more parameters in the group comprising: geographic location of the user device; serving network node identity; detected neighbour network nodes; type of assigned radio communication channel; length of sleep periods in discontinuous reception; mobility for the user device; type of protocol message, type of transmission, and RNTI communication failure.

In an eighth possible implementation form of the method according to any of the implementation forms of the third aspect or the third aspect as such, the first set of network nodes is a subset of the second set of network nodes.

According to a fourth aspect of the invention, the above mentioned and other objectives are achieved by a method in a network node for a radio communication network. The method comprises assigning a first Radio Network Temporary Identifier, RNTI, to a user device, wherein the first RNTI is valid for a first set of network nodes of the radio communication network. The method also comprises assigning at least one second RNTI to the user device, wherein the second RNTI is valid for a second set of network nodes of the radio communication network, and wherein the first set of network nodes and the second set of network nodes are different sets of network nodes. The method also comprises signalling the first RNTI to the user device, and signalling the second RNTI to the user device.

In a first possible implementation form of the method according to the fourth aspect as such, the method further comprises transmitting data to the user device, or receive data from the user device, using the first RNTI or the second RNTI for identifying the user device.

In a second possible implementation form of the method according to the first implementation form of the fourth aspect or the fourth aspect as such, the method further comprises signalling the first RNTI and the second RNTI to the user device in a single radio signal or in separate radio signals.

It is noted that the second RNTI can be the first RNTI with an address space extension. Further, the address space extension may be a common identity for the second set of network nodes.

In a third possible implementation form of the method according to any of the implementation forms of the fourth aspect or the fourth aspect as such, the method further comprises signalling a RNTI control message to the user device, wherein the RNTI control message comprises RNTI selection rules whether the user device should use the first RNTI or the second RNTI.

In a fourth possible implementation form of the method according to any of the implementation forms of the fourth aspect or the fourth aspect as such, the RNTI selection rules for using the first RNTI or the second RNTI are dependent on one or more parameters in the group comprising: geographic location of the user device; serving network node identity; detected neighbour network nodes; type of assigned radio communication channel; length of sleep periods in discontinuous reception; mobility for the user device; type of protocol message, type of transmission, and RNTI communication failure.

The advantages of the methods in the user device and network node are the same as those for the corresponding user device and network node.

It is further noted that the present invention also relates to a wireless communication system comprising at least one user device and at least one network node according to the present invention.

Further, a corresponding method in a wireless communication system comprises the present method in the user device and the present method in the network node.

The present invention also relates to a computer program with a program code for performing a method according to any method according to the second aspect, when the computer program runs on a computer. Further, the invention also relates to a computer program product comprising a computer readable medium storing said mentioned computer program thereon. Said computer readable medium program comprises one or more of: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description

BRIEF DESCRIPTION OF THE DRAWINGS

The appended drawings are intended to clarify and explain different embodiments of the present invention.

DETAILED DESCRIPTION OF ILLUSTRATIVE EMBODIMENTS

Currently User Devices (UDs), such as e.g., UEs in LTE terminology, are identified in one cell only, and thus handover procedure and random access is always needed when the user device moves from one cell to another cell. However, handover could be more predictive and user devices could be identified before handover in predictive manner.

For example, in 5G here are plans for supporting contention based data transmissions and even denser small-cell deployment. Hence, it would be beneficial having a temporary user device identification which would enable user devices keeping their network Identities (IDs) also during idle mode, and handling IDs more dynamically in the radio communication network for mobile user devices. This would enable connectionless and contention based data transmissions and better user device mobility. Connectionless and contention based transmission modes could be defined as modes where there is an association between peer entities but without any data transmission context set-up and with no Quality of Service (QoS) guarantees.

Furthermore, in dense radio communication networks, the cells in cellular systems become smaller thereby requiring faster mobility handling of the user devices. This in turn may require more frequent measurement in the user device and also requires that the user device transmit the measurement results to the radio communication network more frequently. The more neighbour cells and the higher accuracy of measurements needed, the longer the user device has to utilize resources in the receiver chain which will consume more power. Hence, there is a relationship between mobility handing and power consumption.

Additionally with current RNTIs the user devices cannot be connected to several network nodes with the same temporary identifier (RNTI). If that would be possible, the user device could do handover more smoothly; or data packets addressed for user devices could be better routed through several network nodes.

Therefore, the present invention relates to a user device and a network node for wireless communication systems which mitigates or solves the drawbacks and problems of conventional solutions.

Figure 1:
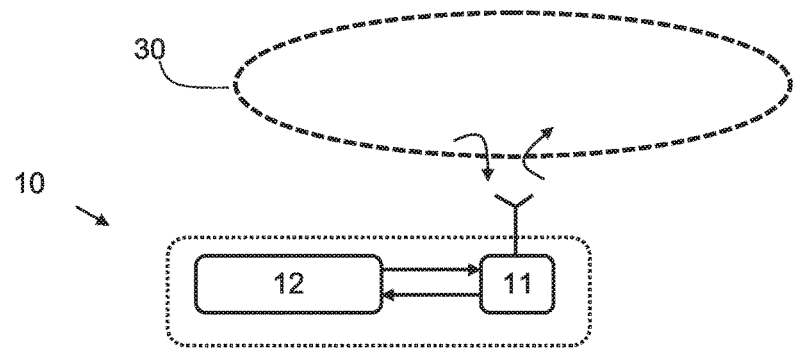
FIG. 1 shows a user device according to an embodiment of the present invention.

FIG. 1 shows a user device 10 according to an embodiment of the present invention. The user device 10 comprises a transceiver 11 configured to receive a first Radio Network Temporary Identifier, RNTI. The first RNTI is valid for a first set of network nodes of a radio communication network 30. The transceiver 11 is further configured to receive at least one second RNTI, wherein the second RNTI is valid for a second set of network nodes of the radio communication network 30. The first set of network nodes and the second set of network nodes are different sets of network nodes. The transceiver 11 is yet further configured to transmit data to the radio communication network 30, or receive data from the radio communication network 30, using the first RNTI or the second RNTI (illustrated with the two arrows in FIG. 1). In this particular example the user device 10 also comprises a processor 22 which is communicably coupled with the transceiver 21.

Figure 2:
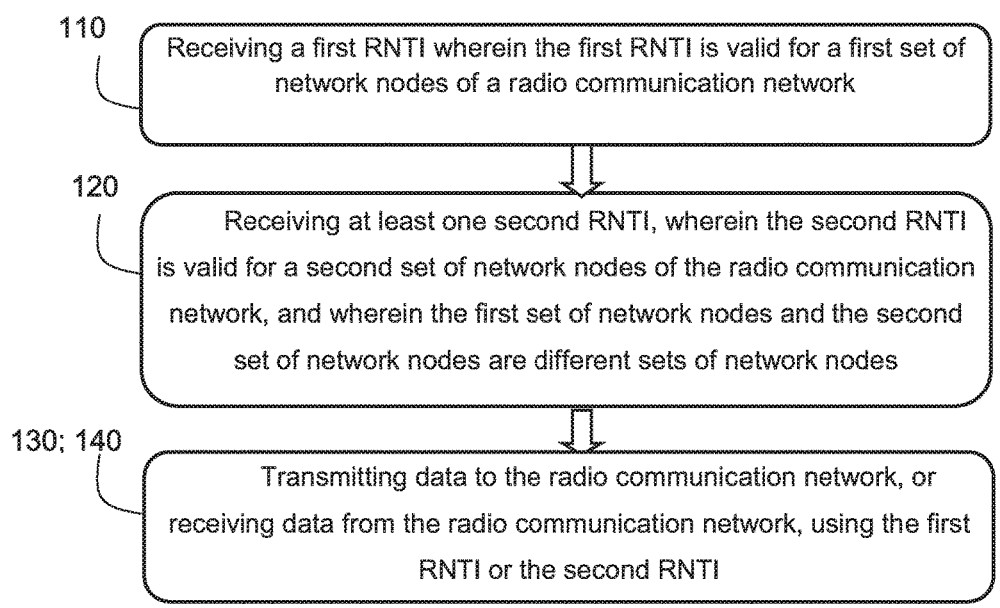
FIG. 2 shows a flow chart of a method in a user device according to an embodiment of the present invention.

FIG. 2 shows a flow chart of a method in a user device 10 according to an embodiment of the present invention. The method comprises receiving 110 a first RNTI, wherein the first RNTI is valid for a first set of network nodes of a radio communication network 30. The method further comprises receiving 120 at least one second RNTI, wherein the second RNTI is valid for a second set of network nodes of the radio communication network 30, and wherein the first set of network nodes and the second set of network nodes are different sets of network nodes. The method further comprises transmitting 130 data to the radio communication network 30, or receiving 140 data from the radio communication network 30, using the first RNTI or the second RNTI.

A relevant question for the user device 10 is when and how to use the first RNTI and the second RNTI for transmitting and/or receiving data to or from the radio communication network 30. Advantageously, it is proposed to use RNTI selection rules for deciding when to use the first RNTI or the second RNTI.

Therefore, in an embodiment of the present invention, the processor 12 of the user device 10 is configured to provide the RNTI selection rules as e.g. a control algorithm. This means that the RNTI selection rules are given internally and may e.g. be given by a wireless communication standard, such as 3GPP standards. Since the RNTI selection rules are given internally the selection rules can be provided fast and without external signalling.

Alternatively, the transceiver 11 of the user device 10 may be further configured to receive a RNTI control message from the radio communication network 30 comprising the RNTI selection rules. The RNTI control message can be signalled from one or more network nodes of the radio communication network 30 to the user device 10. The radio communication network 30 can in this embodiment control and update the used RNTIs.

With the RNTI selection rules the transceiver 11 of the user device 10 is further configured to transmit data to the radio communication network 30, or receive data from the radio communication network 30, using the first RNTI or the second RNTI according to the RNTI selection rules.

The RNTI selection rules may according to an embodiment of the present invention be dependent on one or more parameters in the group comprising: geographic location of the user device 10; serving network node identity; detected neighbour network nodes; type of assigned radio communication channel; length of sleep periods in discontinuous reception; mobility for the user device 10; type of protocol message, type of transmission, and RNTI communication failure.

The RNTI selection rules should be designed to make sure that the right RNTI is used in the right set of network nodes or in cells that corresponds to the set of network nodes. In a typical example where the first RNTI is valid in a smaller set of cells (or network nodes) than for the second RNTI, it shall be avoided that the first RNTI is used in the second set of cells.

The RNTI selection rules based on the geographic location of the user device 10 the second RNTI can be used when the user device 10 is close to the edge of the first set of cells, or when it is likely that it is no longer inside the coverage area of the first set of cells.

The RNTI selection rules based on the serving network node identity and detected neighbour network nodes also allows the selection of the most appropriate RNTI depending on an approximate location of the user device 10.

The RNTI selection rules based on the type of assigned radio communication channel allows the radio communication network 30 to use channels with different geographical reuse patterns for the RNTIs.

The RNTI selection rules based on the length of sleep periods in discontinuous reception or the mobility of the user device 10 will typically use the second RNTI when there is a higher probability that the user moves outside the coverage of the first RNTI. This probability increases during fast mobility or with long sleep periods, because the location of the user device 10 at the next transmission instant is more uncertain.

The RNTI selection rules based on the type of protocol message or type of transmission allows some messages, which have higher probability of being transmitted outside the coverage area of the first set of cells to be transmitted using the second RNTI. This may for example be handover related messages, failure recovery messages, or connection setup messages.

The RNTI selection ruled based on RNTI communication failures for selecting the RNTI is to reactively change the RNTI when it has been detected that the first RNTI is not working (not valid). This may occur when the first RNTI is being used outside the first set of network nodes, and the rule may be that the user device shall select the second RNTI instead when such a failure occurs.

Figure 3:
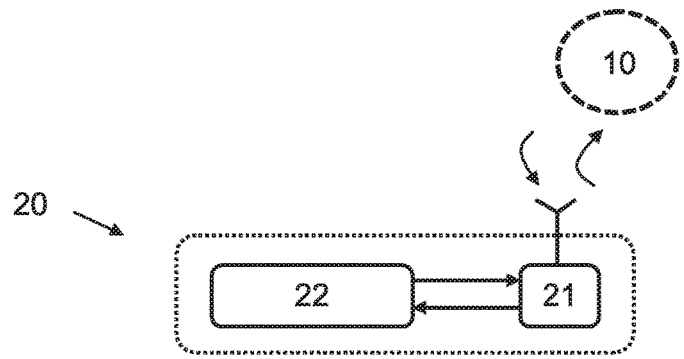
FIG. 3 shows a network node according to an embodiment of the present invention.

FIG. 3 shows a network node 20 according to an embodiment of the present invention. The network node 20 comprises a transceiver 21 and a processor 22 which are communicably coupled with each other in the network node 20. The processor 22 is configured to assign a first RNTI to a user device 10. The first RNTI is valid for a first set of network nodes of the radio communication network 30. The processor 22 is further configured to assign at least one second RNTI to the user device 10, wherein the second RNTI is valid for a second set of network nodes of the radio communication network 30. The first set of network nodes and the second set of network nodes are different sets of network nodes. The transceiver 21 is configured to signal the first RNTI to the user device 10, and signal the second RNTI to the user device 10. This is illustrated with the two arrows in FIG. 3.

Figure 4:
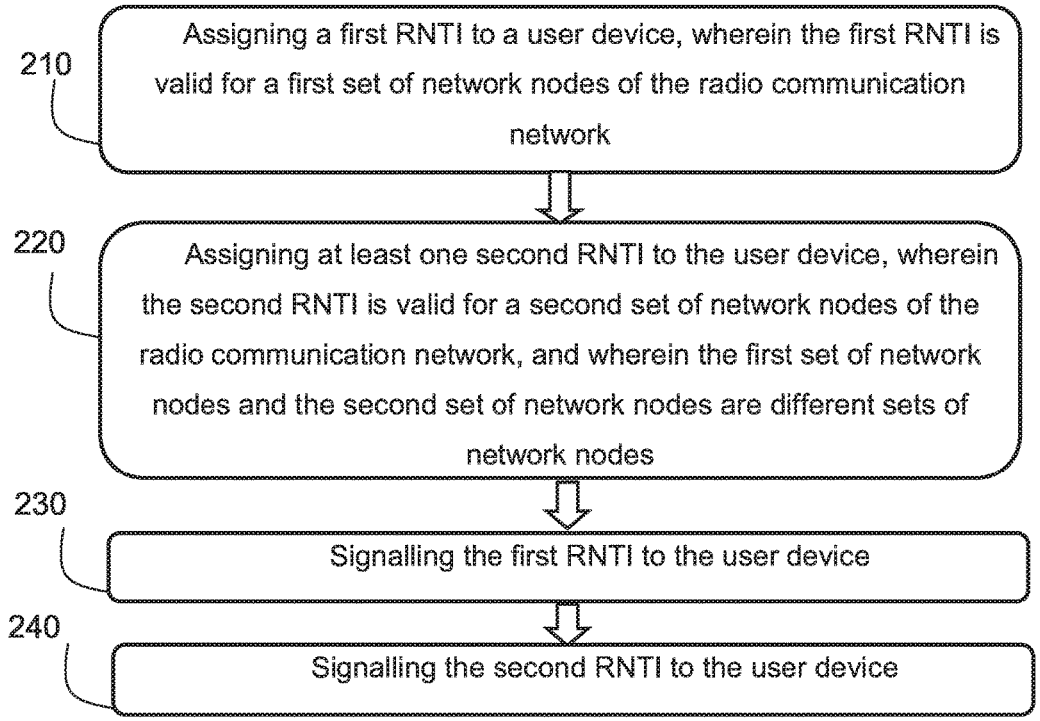
FIG. 4 shows a flow chart of a method in a network node according to an embodiment of the present invention.

FIG. 4 shows a flow chart of a method in a network node according to an embodiment of the present invention. The method comprises assigning 210 a first RNTI to a user device 10, wherein the first RNTI is valid for a first set of network nodes of the radio communication network 30. The method further comprises assigning 220 at least one second RNTI to the user device 10, wherein the second RNTI is valid for a second set of network nodes of the radio communication network 30, and wherein the first set of network nodes and the second set of network nodes are different sets of network nodes. The method further comprises signalling 230 the first RNTI to the user device 10, and signalling 240 the second RNTI to the user device 10.

In an embodiment of the present invention, the transceiver 21 of the network node 20 is further configured to transmit data to the user device 10, or receive data from the user device, using the first RNTI or the second RNTI for identifying the user device 10. According to this embodiment the same network node assigns the first and the second RNTIs to the user device 10 and performs data communication with the user device 10. This is however not necessary since the invention also covers the embodiments in which one or more network nodes perform the assignment and transmission of the first and second RNTIs and one or more other network nodes communicates with the user device 10 using the first and the second RNTIs, respectively.

Moreover, instead of letting the user device 10 measure and report the downlink channel according to conventional solutions, another possibility is to let the user device 10 broadcast a beacon signal and let the radio communication network 30 identify the beacon signal by one or more network nodes and thereby determine the location (i.e. the mobility handling) for this user device 10. The radio communication network 30 can use this to assign resources for communicating with this user device 10 when the user device 10 moves through the wireless communication system. This however requires a temporary identity (i.e. a RNTI) that is valid within a set (or cluster) of network nodes. In case the user device 10 moves into an area where the first RNTI is already used, the first RNTI must be reconfigured to guarantee that the RNTI is valid. Hence, in order to avoid this signalling, it would be beneficial if one or the first or the second RNTI can be valid in an as large area as possible, i.e. the area associated with the first or the second set of network nodes is as large as possible.

Further, the transmission of the RNTI from the user device 10 will consume power. The longer the RNTI, the more energy is needed to transmit the RNTI. But, the longer the RNTI the larger is the address space. Hence there is a trade-off between using long and short RNTIs (also referred to as first and second RNTIs) and methods to efficiently handling the addressing in the radio communication network 30 will be very important.

Figure 5:
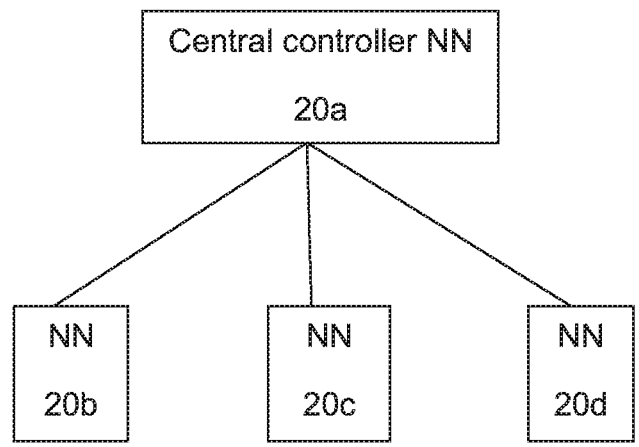
FIG. 5 shows an example of a single centralized RNTI controller according to an embodiment of the present invention.

In an embodiment of the present invention, one possible way to handle the first and the second RNTIs would be to introduce a single central controller network node, which would control RNTI address space in the network and suggest which new RNTI should be used in which network node(s). This is depicted in FIG. 5 in which a central Network Node (NN) 20a controls the other network nodes 20b, 20c, . . . , 20n of the network and assigns first and second RNTIs in the radio communication network.

In an embodiment of the present invention, the controller network node can be a dedicated network node of the network, or be functionality located inside a network node, or even in a network control node (e.g. in Operations and Management, OAM, devices). The basic functionality would be to guarantee that no network node receives the same RNTI from two different user devices 10. The controller network node may use information from all connected network nodes to guarantee this. But it is also important to minimize the need for changing the RNTI too frequently since this requires additional signalling between the network and the user device 10.

The controller network node may use different schemes to achieve this. The following is a non-exhaustive list of possible schemes which the controller network node may use in this respect:

Static, divide the address space of the RNTIs into different sets, where these sets are statically assigned to the network node in the network in a pattern that minimize the risk that two RNTI are used in the proximity of each other.

Dynamic, use information of user device 10 location to assign RNTIs that maximizes the distance between the usage of the same RNTI. The distance may e.g. be a geographical distance based on the user device location or the geographical distance based on the position of the network node or the distance. Instead of the geographical distance, the relative distance from radio interference point of view could also be considered. In addition to location, other information, such as velocity, usage pattern, etc. for the user device 10 may also be used.

A combination of the above static and dynamic approaches where part of the address space of the RNTI is handled in a static way and part is handled in a dynamic way.

In the above solutions, the controller network node would monitor the usage of the RNTIs and the mobility of the user device and initiate an RNTI change when there is a risk that the same RNTI is used by another user device in close proximity, i.e. where there is a risk that the RNTI is no longer valid. In this case, the controller network node may, with the assistance of other network nodes, request one of the user devices to change the RNTI.

Figure 6:
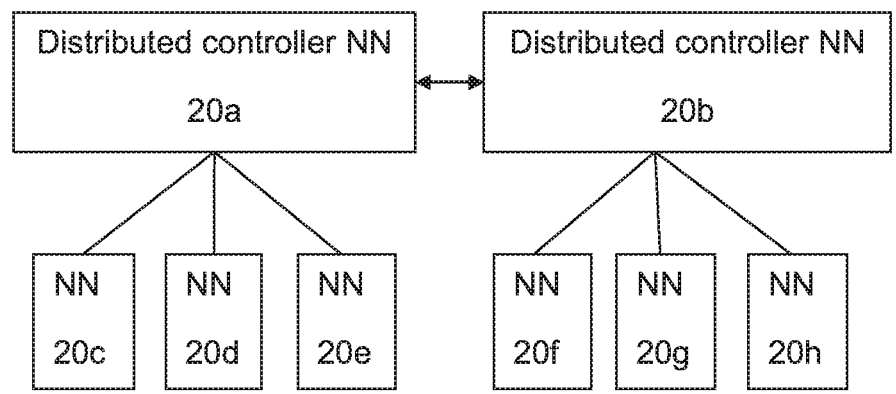
FIG. 6 shows an example of multiple of centralized RNTI controllers according to an embodiment of the present invention.

In most practical network scenarios however, using a centralized central controller network node (or coordinator) may not be feasible. Reasons for that include the lack of scalability, e.g. if the number of network nodes increases. Therefore, it is feasible to divide the task of the controller network node into separate areas in the radio communication network. This can be done by introducing a peer-to-peer functionality between these distributed controller network nodes as illustrated in FIG. 6. In the example two distributed controller network nodes 20a and 20b are shown. The network node 20a controls a first set of network nodes 20c, 20d and 20e while network node 20b controls a second set of network nodes 20f, 20g and 20h. The controller network nodes 20a and 20b are configured to exchange information relevant for RNTI handling in the radio communication network 30. Further, the controller network nodes 20a and 20b are responsible for assigning RNTIs in their respective set of network nodes.

The functionality described for the centralised controller network node could also apply for the described distributed controller network nodes. But since the functionality is now divided into separate entities, there is now a need to add information exchange between the controller network nodes illustrated with the arrow in FIG. 6.

In an embodiment of the present invention, the RNTI usage is optimized within each distributed controller network node, and when the user device 10 approaches the border of an area controlled by one distributed controller network node, the controller network node exchange information with the controller network node for the neighbouring area, as show in FIG. 6. The serving controller network node may for example check whether the RNTI is allowed to be used in the area closest to the border of the target controller network node, e.g. by a RNTI request message. The target controller network node may acknowledge this, or if the RNTI is not possible to use, optionally suggest one or more other RNTIs that are possible to use.

Figure 7:
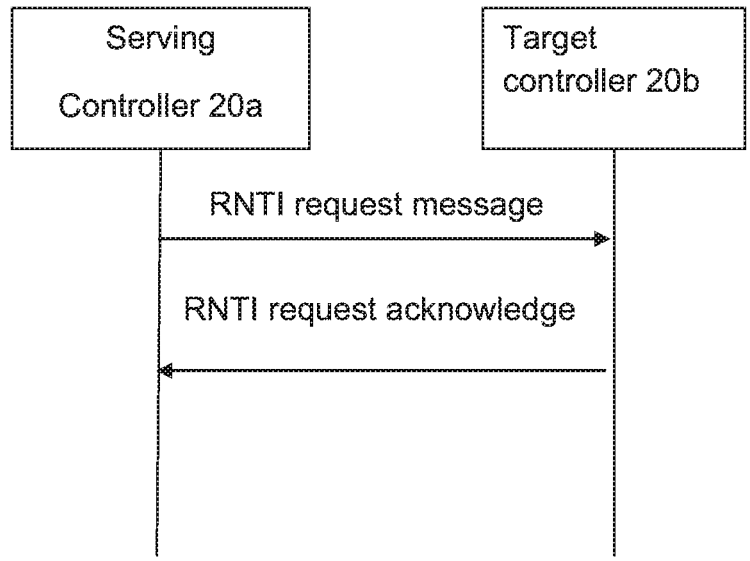
FIG. 7 shows an example of RNTI message signalling according to an embodiment of the present invention.

FIG. 7 illustrates this embodiment of the present invention. The serving controller network node 20a transmits a RNTI request message to the target controller network node 20b which process the RNTI request message and reply with a RNTI request acknowledge message to the serving controller network node 20a.

In order to facilitate this procedure, the serving controller network node 20a could include the current RNTI and the location of the user device 10 in the RNTI request message. The location of the user device 10 can be expressed in different ways, e.g. as a geographic location of the user device 10 or the serving network node or with information about the identities of the serving network node or the closest neighbouring network node controlled by the target controller, in which case the target controller may use a database (or similar) to estimate distance between the usage of the RNTI with the usage of RNTI in network node under its control. In addition to location, other information, such as velocity, usage pattern, etc. of the user device 10 may also be used.

In an embodiment of the present invention, the controller network nodes continuously exchange information regarding the usage of RNTI in a similar way as described above. But instead of just exchanging information for user devices in the proximity of the border to other controller network nodes, the controller network nodes exchange the usage and location for all RNTIs under its control. In this way, the distributed controller network nodes will have full knowledge about the RNTI usage in all neighbouring controllers. This could also be extended to exchanging this information not only between neighbouring controller network nodes but to all controller network nodes in the radio communication network.

Figure 8:
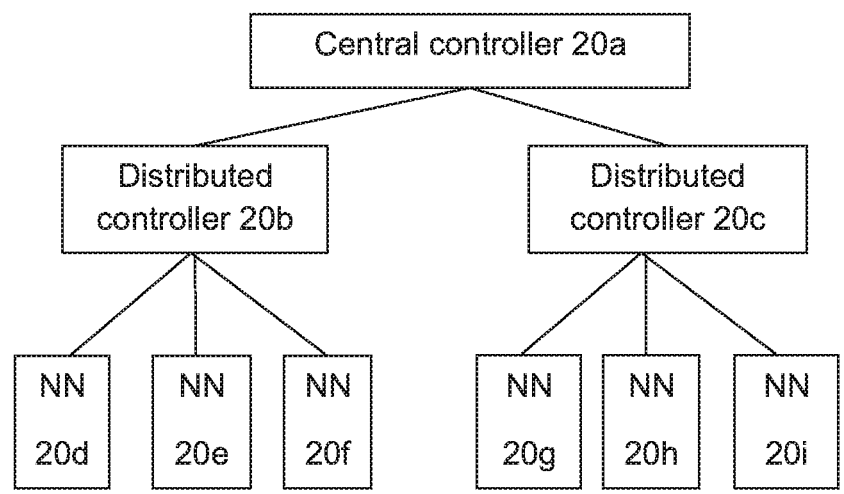
FIG. 8 shows an example of a centralized RNTI controller and distributed RNTI controllers cooperating according to an embodiment of the present invention.

In an embodiment of the present invention, a central coordinator controller network node is introduced. This is illustrated in FIG. 8. The central coordinator controller 20a controls two distributed controllers 20*b* and 20*c*. The distributed controllers 20*b* and 20*c* each controls three network nodes 20*d*, 20*e*, 20*f* and 20*g*, 20*h*, 20*i*, respectively. The central coordinator controller network node 20*a* can operate on a slower time scale compared to the distributed controller network nodes 20*b* and 20*c*. As an example, the distributed controller network nodes 20*b* and 20*c* may inform the central controller network node 20*a* of the RNTIs that are currently not in use and therefore feasible for usage in another controller network node. This could for example be used for fast moving user devices that run a bigger risk of moving between areas controlled by different controller network nodes. The central coordinator controller 20*a* may then inform the distributed controllers 20*b* and 20*c* of the current usage of RNTI in neighbour controller network nodes, or even the usage in all distributed controller network nodes.

Figure 9:
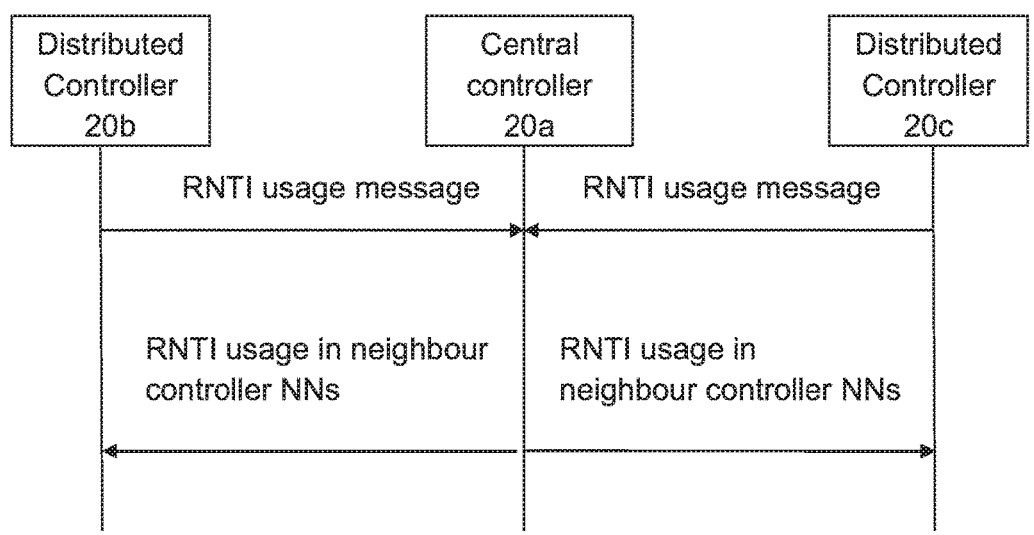
FIG. 9 shows an example of RNTI message signalling between centralized RNTI controller and distributed RNTI controllers according to an embodiment of the present invention.

FIG. 9 illustrates the information exchange between the different controller network nodes of the embodiment shown in FIG. 8. FIG. 9 shows how the distributed controllers 20*b* and 20*c* transmit RNTI usage messages to the central coordinator controller 20*a*. The central controller 20*a* thereafter transmits information about the RNTI usage in neighbour controller network nodes to the distributed controllers 20*b* and 20*c* which can use this information for assigning RNTIs in their respective sets of network nodes under their control.

Other possibility to further enhance RNTI assignment to user devices could be to consider a slightly different usage of RNTIs by user devices. For example every user device could be assigned with a "short" RNTI, also referred to as first RNTIs as currently in LTE and one or more additional RNTIs, also referred to as "long" RNTIs or second RNTIs and RNTI selection rules for when and how to use these different RNTIs. As mentioned the RNTI selection rules can be either defined in the standard and e.g. implemented in the user device 10, or signalled to the user device 10 possibly together with the RNTI from the network 30 via one or more network nodes in a RNTI control message. Examples of this RNTI selection rules could for example contain RNTI selection rules for when to use the different RNTIs depending on:

Geographic location of the user device 10;
Serving network node identity;
Detected neighbour network nodes;
Type of assigned radio communication channel;
Length of sleep periods in discontinuous reception;
Mobility for the user device to;
Type of protocol message, type of transmission, and RNTI communication failure.

The additional RNTIs can either be used as extensions to the short RNTI (i.e. where they together form an RNTI) or defined as a completely separate RNTI. According to the former embodiment the additional (or long) RNTI is the short RNTI with an address space extension. Further, the address space extension may be a common identity for the set of network nodes for which the additional (long) RNTI is valid.

Assuming that unique and valid short RNTIs are allocated to each user device within a set of RNTIs, and additional bits (e.g. 3 bits) specific to the set of network nodes are only included in the RNTI in special cases when the user device 10 is not sure if its RNTI is valid, e.g. if the user device 10 is not within the same set where the RNTI was allocated, or if it has not been connected for some time. In the mentioned situations the additional (long) RNTI used for downlink and/or uplink transmissions could be for example formed as:

RNTI: 16 bits, cell ID: 4 bits, cluster ID 4 bits, etc. (i.e. multiple levels);
RNTI: 16 bits, cell ID 128 bits (e.g. unique cell ID);
RNTI: 32 bits, cluster ID 128 bits (no cell ID);
Also the possibility to use completely different long RNTI instead of short RNTI with extension(s) when user device 10 is not aware whether it can be recognized in the network or not is possible.

The extended address space could also be used when the user device 10 approaches the edge of an area for an associated set of network nodes in mobility related signalling that could make such messages more robust, i.e. they could be received by a target network node. Regardless of whether a message with extended RNTI is received by an network node in the source set of network nodes or in the target set of network nodes it would need to evaluate if the RNTI needs to be changed, e.g. because the short RNTI (with different extension bits) is used in the target set of network nodes. When a new network node receives a message that contains extension bits from a different network node it can use the extension bits to identify the source network node. It can therefore send a message to the source network node and notify that the RNTI can be released once the user device 10 has been assigned a new RNTI. One possible example how RNTI change could be handled during handover, if RNTIs short part is already reserved in the target network node is illustrated in FIG. 10.

Figure 10:
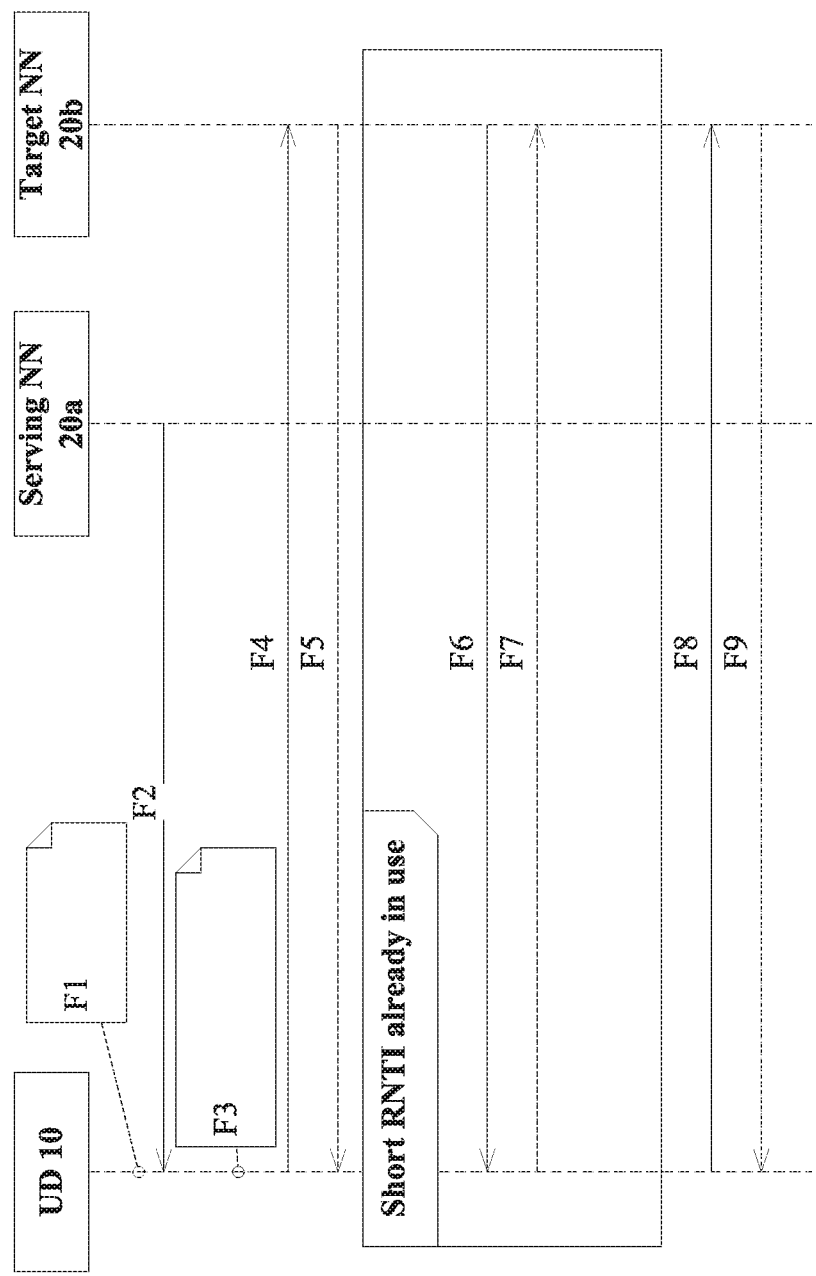
FIG. 10 shows an example of signalling between a user device and network nodes according to an embodiment of the present invention.

In FIG. 10 Uplink (UL) transmissions can be also e.g. scheduling requests and acknowledgement for those could be e.g. valid UL grant. The new RNTI can be assigned in some own message or e.g. utilizing DL control signalling. The signalling in FIG. 10 is as follows:

F1, the UD 10 only uses a short RNTI;
F2, the UD 10 receives a command to user extended (long) RNTI from the serving NN 20*a*;
F3, handover for the UD 10 or the network moves the UD context target to target NN 20*b*;
F4, the UD 10 transmits data to the target NN 20*b* using extended RNTI;
F5, the target NN 20*b* transmits an acknowledgment to the UD 10;
if however the short RNTI is already in use in the NN listening to the UD 10 transmission:
F6, the target NN 20*b* assigns new short RNTI using the extended RNTI;
F7, the UD 10 acknowledge the new short RNTI;
F8, the UD 10 starts using the new short RNTI for communication with the target NN 20*b*;
F9, the target NN 20*b* transmits acknowledgement to the UD 10.

Figure 11:
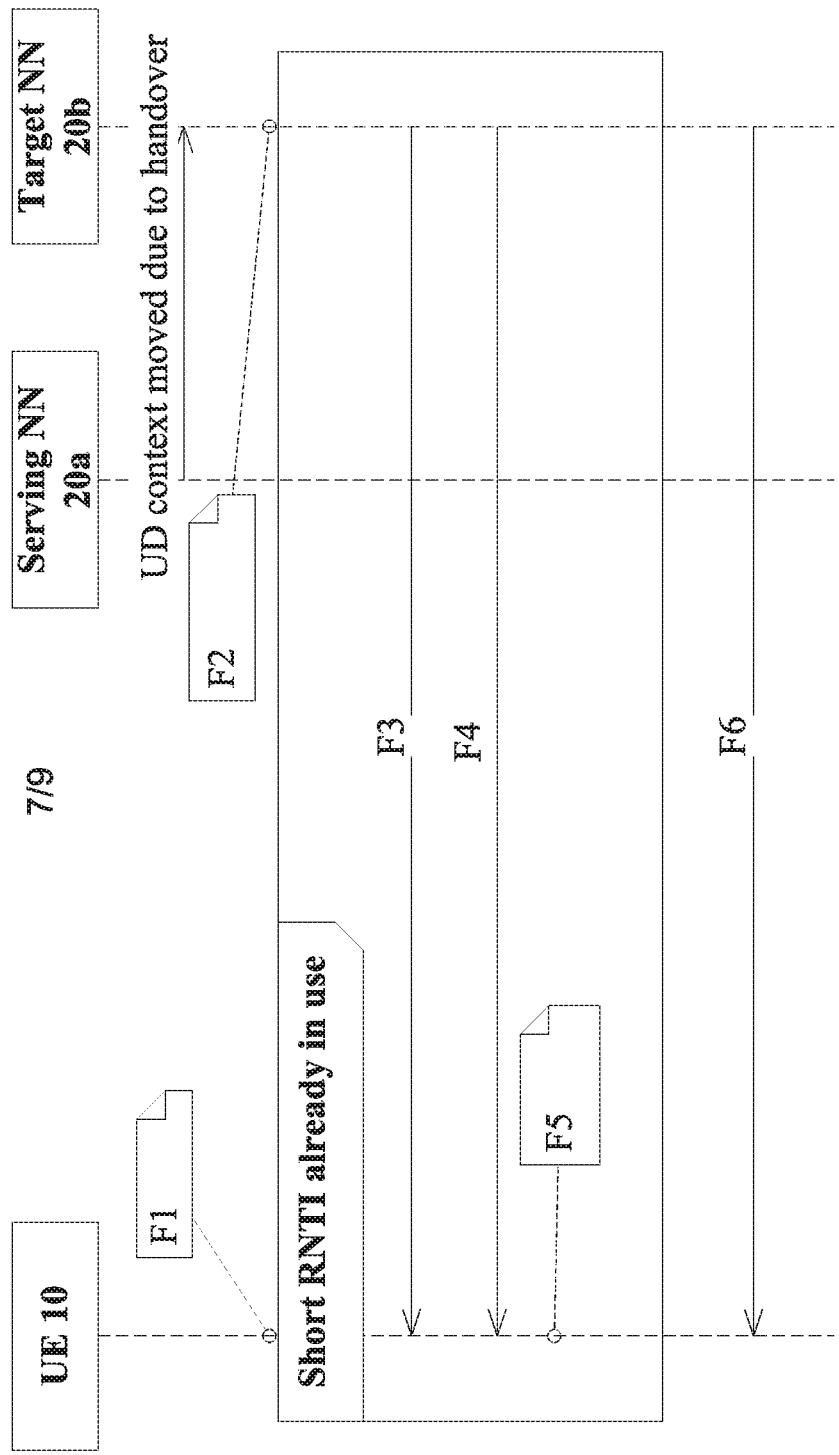
FIG. 11 shows another example of signalling between a user device and network nodes according to an embodiment of the present invention.

In FIG. 11 another example is illustrated. There user device 10 context is moved between source and target network nodes. The signalling in FIG. 11 is as follows:

F1, the UD 10 has done handover or the network has changed UD context from the serving NN 20*a* to the target NN 20*b*;
F2, if UD's short RNTI is already in use in the target NN 20*b*, a new short RNTI or both RNTIs is/are assigned for the UD 10;
if however the short RNTI is already in use in the NN listening to the UD transmission:
F3, the target NN 20*b* may transmit to the UD 10 using the extended RNTI already known to the UD 10;
F4, the target NN 20*b* assigns new short RNTI (or short and long RNTIs) by using the extended RNTI already known by the UD 10;

F5, the UD 10 starts using the new short RNTI for communication with the target NN 20*b*;

F6, the target NN 20*b* starts using the new short RNTI for communication with the UD 10.

Also legacy systems like e.g. LTE could utilize the present RNTI extension method. For example, a user device (i.e. UE in LTE) could start connection establishment from idle mode to connected mode by sending preamble equivalent message scrambled with or including its long RNTI. Then the Random Access Response (Cyclic Redundancy Check (CRC) bits scrambled with user devices long RNTI) could contain UL grant, timing advance, new cell/cluster addition part of RNTI and possibly whole new short RNTI if change is needed due to RNTI collision.

Above mentioned RNTI handling solutions could also simplify inter-Radio Access Technology (RAT) mobility if the extended RNTI is used e.g. at reconnection in a different RAT. Hence, extension of the RNTI could be added to all legacy systems like LTE and UMTS to help interoperability.

With the definition of an extended long RNTI in two parts (short and extended part) an important question is whether it shall be possible to reassign bits between the prefix and the short RNTI parts. Reassigning would allow more adaptive assignments, but it requires some way of marking where the border is, similar to address mask for IP-addresses. Since the short RNTI will be included in many messages the reassignment could be done by broadcast signalling that indicates how many bits should be in the prefix and in the short RNTI in a particular access network or area. This would still require the user device 10 and the network node 20 to reconfigure the number of bits used in the RNTI fields of the protocol headers. A fixed limit is much simpler to implement since the information elements/protocol fields have fixed lengths, but it puts restrictions on the possibility to adapt the cluster size and/or the number of user devices that can be accommodated in different states when the traffic pattern varies.

Regarding mobility handling of the user device 10 a simple solution could be e.g. adding area coding to the downlink (DL) control messaging. That area code could be used as part of RNTI. For example, if the user device 10 has entered to new area associated with a set of network nodes, it could utilize RNTI extended with area coding from previous area until a first successful transmission has been done. If network notices upcoming RNTI collision, the RNTI shall be changed immediately.

Furthermore, one possible way to streamline mobility of the user device 10 is to make handovers more predictive. For example, if a user device 10 is approaching a cell edge, the source cell could start asking if user's RNTI is available in target set of network nodes. If the RNTI is available in the target controller, then RNTI could be reserved for possible handover. If the RNTI is not available, the target set of network nodes and source set of network nodes could negotiate RNTI, which is free in both sets and this RNTI could be assigned to the user device 10. If for some reason handover would not happen, source could free this RNTI from target network node or alternatively target network node could have release timer for this RNTI.

To enable a user device 10 to send occasional connectionless or contention based data during idle mode, user devices could keep its RNTI also during idle mode. The RNTI could be freed if the user device 10 is not transmitting any data or renewing its RNTI during certain time period.

Alternatively, different classes of RNTIs could be introduced for different states of user device. For example, user devices in idle mode could utilize longer RNTI values valid in whole paging area and thus free short RNTIs for connected user devices. When the user device is establishing RRC connection it could utilize longer RNTI and the network node could change the short part if a short RNTI was assigned to another user device during idle mode.

In an embodiment of the present invention, the first RNTI and the second RNTI from the radio communication network 30 are received in a single radio signal or in separate radio signals. Thereby, e.g. short and long RNTIs may be transmitted in the same signal or in separate signals depending the application and communication requirements.

Figure 12:
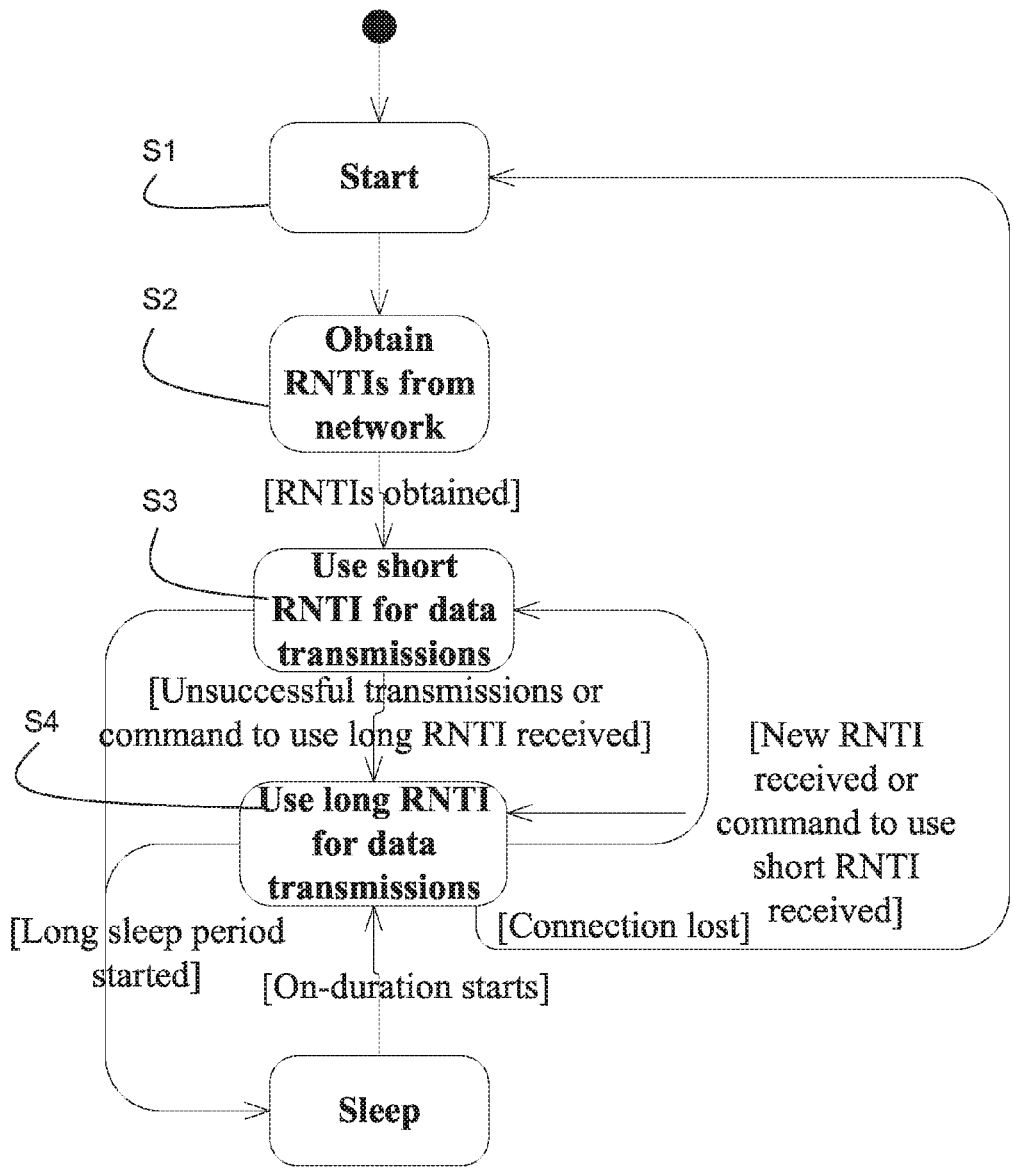
FIG. 12 shows a flow chart of a method for RNTI handling in the user device according to an embodiment of the present invention.

FIG. 12 shows a flow chart of RNTI handling of short and long RNTI from a user device 10 perspective. S1) At the start the user device does 10 not have any RNTI assigned. S2) The user device 10 obtain first and second RNTIs from the radio communication network. This may e.g. be done during a connection setup procedure. S3) The user device 10 uses the short RNTI for data transmissions. S4) If transmission with the short RNTI fails the user device 10 changes to use the long RNTI. This may also happen if the radio network signals a command to the user device 10 to use the long RNTI. During transmissions with the long RNTI the user device 10 may receive a new RNTI from the radio network, or the radio network may instruct the user device to use the short RNTI instead. In both these cases the user device 10 will go back to using the short RNTI. If the connection is lost the transmissions do not succeed even when the long RNTI is used and the user device 10 has to go back to the start state in S1) without any valid RNTIs. The user device 10 may also change to sleep mode for a longer period. During the sleep mode the user device keeps the first and second RNTIs that it has been assigned, and after the user device 10 wakes up the user device 10 uses the long RNTI for the first transmission for increased robustness.

Figure 13:
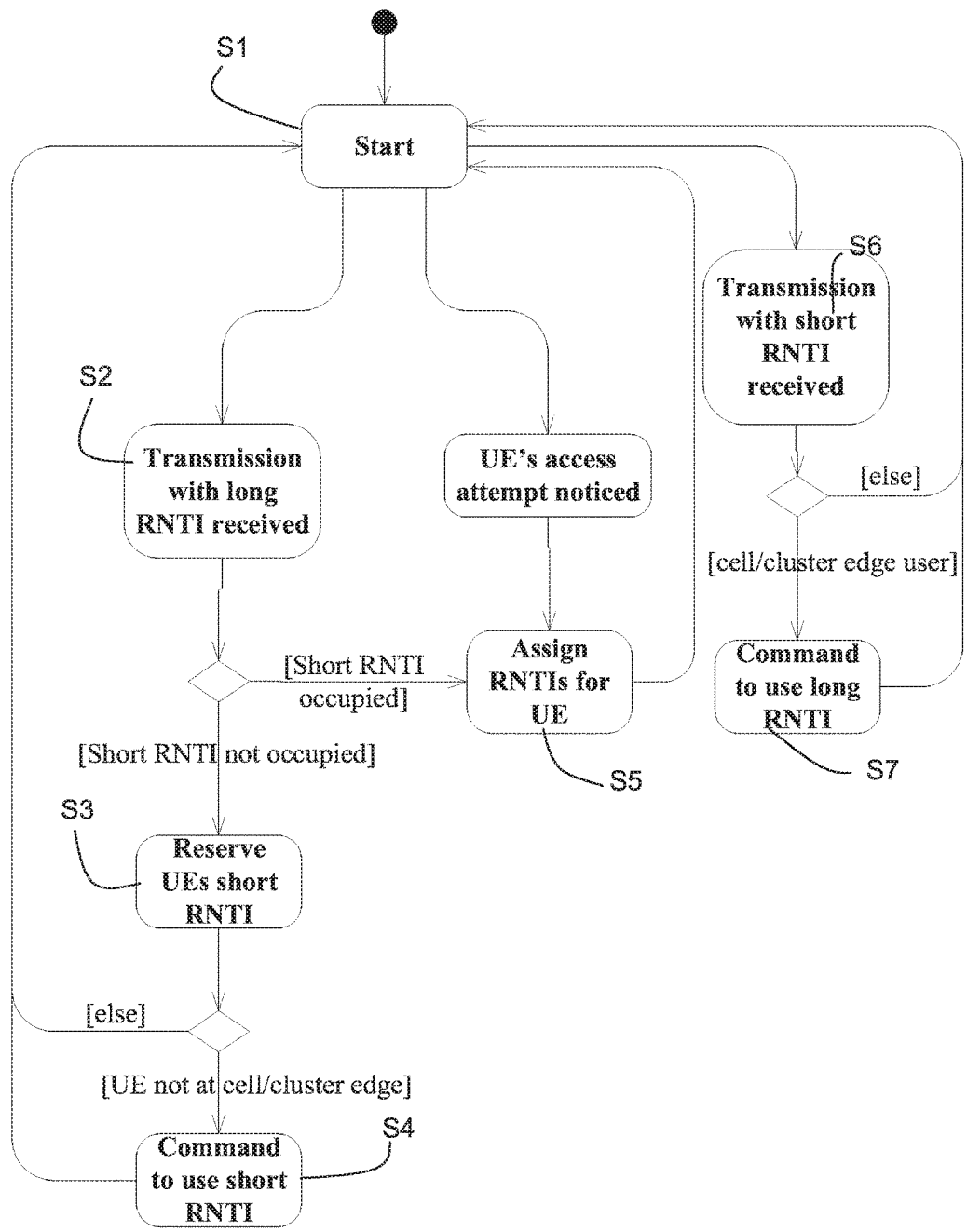
FIG. 13 shows a flow chart of a method for RNTI handling in the radio network/network node(s) according to an embodiment of the present invention.

FIG. 13 shows a flow chart of RNTI handling of short and long RNTI from a network node 20 perspective. This procedure shows how RNTIs for one user device 10 is handled. S1) In the starting state the user device 10 has not been assigned first and second RNTIs by the network node, but the user device 10 may have been assigned RNTIs by another network node(s). S2) If transmission with a long RNTI is received the network node checks if the short RNTI part is already occupied. S3) If the short RNTI is not occupied the network node reserves the short RNTI for the user device 10. If the user device 10 is at the edge of a cell the user device 10 may be required to continue using the long RNTI. S4) Otherwise the network node may command the user device 10 to use the short RNTI. S5) If the short RNTI used by the user device 10 is occupied, the network node will instead assign a new short RNTI for the user device 10. In many embodiments a new long RNTI will be assigned at the same time. The assignment of new RNTIs also happens if the network node receives an access attempt from a user device 10 that is not yet connected, and therefore does not have any RNTIs assigned. S6) When the radio network receives transmissions with a short RNTI the radio network may need to command the user device 10 to use the long RNTI instead at S7). This is typically the case for cell edge user devices, where the user device cannot be guaranteed that the short RNTI is sufficient to identify the user device. The network node may also command the user device 10 to use the long RNTI if the network node for some other reason suspects that the short RNTI is not unique and valid in the cell. The long RNTI transmission will then be used to determine if a new RNTI is required.

Furthermore, any method according to the present invention may be implemented in a computer program, having a program code, which when run by processing means causes the processing means to execute the steps of the method. The computer program is stored in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present user device and network node comprise the necessary communication capabilities in the form of e.g., functions, means, units, elements, etc., for performing the present solution. Examples of other such means, units, elements and functions are: processors, communication couplings, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present transmitter device may comprise, e.g., one or more instances of a Central Processing Unit (CPU), a processing unit, a processing circuit, a processor, an Application Specific Integrated Circuit (ASIC), a microprocessor, processing means, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A user device, the user device comprising a transceiver, wherein the transceiver is configured to:
   receive a first Radio Network Temporary Identifier (RNTI), wherein the first RNTI is valid for a first set of network nodes of a radio communication network, and wherein the first set of network nodes comprises at least two network nodes;
   receive a second RNTI, wherein the second RNTI is valid for a second set of network nodes of the radio communication network, and wherein the second set of network nodes comprises at least two network nodes, and the first set of network nodes and the second set of network nodes are different sets of network nodes; and
   transmit data to the radio communication network, or receive data from the radio communication network, using the first RNTI or the second RNTI,
   wherein the first RNTI is used to transmit or receive the data when the user device is in a connected state, and the second RNTI is used to transmit or receive the data when the user device is a state other than the connected state, wherein in the connected state the user device is connected to at least one network node of the radio communication network, and wherein at any given moment the user device communicates using only one of the first RNTI or the second RNTI.

2. The user device according to claim 1, wherein the transceiver is further configured to:
   receive the first RNTI and the second RNTI from the radio communication network in a single radio signal.

3. The user device according to claim 2, wherein the second RNTI is the first RNTI with an address space extension.

4. The user device according to claim 3, wherein the address space extension is a common identity for the second set of network nodes.

5. The user device according to claim 1, wherein the transceiver is further configured to:
   start transmitting data to the radio communication network using the first RNTI; and
   transmit data to the radio communication network using the second RNTI when transmitting data to the radio communication network using the first RNTI fails.

6. The user device according to claim 1, wherein using the first RNTI or the second RNTI is according to RNTI selection rules.

7. The user device according to claim 6, wherein the user device further comprises a processor configured to provide the RNTI selection rules, or wherein the transceiver is further configured to receive a RNTI control message from the radio communication network comprising the RNTI selection rules; and
   wherein the transceiver is further configured to transmit data to the radio communication network, or receive data from the radio communication network, using the first RNTI or the second RNTI according to the RNTI selection rules.

8. The user device according to claim 7, wherein the RNTI selection rules for using the first RNTI or the second RNTI are dependent on one or more of the following parameters: geographic location of the user device, serving network node identity, detected neighbour network nodes, type of assigned radio communication channel, length of sleep periods in discontinuous reception, mobility for the user device, type of protocol message, type of transmission, and RNTI communication failure.

9. A network node, comprising:
   a transceiver; and
   a processor, configured to:
      assign a first Radio Network Temporary Identifier (RNTI) to a user device, wherein the first RNTI is valid for a first set of network nodes of a radio communication network, and wherein the first set of network nodes comprises at least two network nodes; and
      assign a second RNTI to the user device, wherein the second RNTI is valid for a second set of network nodes of the radio communication network, and wherein the second set of network nodes comprises at least two network nodes, the first set of network nodes and the second set of network nodes are different sets of network nodes, and the first set of network nodes is a subset of the second set of network nodes;
   wherein the transceiver is configured to signal the first RNTI to the user device and to signal the second RNTI to the user device, and
   wherein the first RNTI is used by the user device to transmit or receive data when the user device is in a connected state, and the second RNTI is used by the user device to transmit or receive data when the user device is in a state other than the connected state of the user device, wherein in the connected state the user device is connected to at least one network node of the radio communication network, and wherein at any given moment the user device communicates using only one of the first RNTI or the second RNTI.

10. The network node according to claim 9, wherein the transceiver is further configured to:
   transmit data to the user device, or receive data from the user device, using the first RNTI or the second RNTI for identifying the user device.

11. The network node according to claim 10, wherein the transceiver is further configured to:
   signal the first RNTI and the second RNTI to the user device in a single radio signal.

12. The network node according to claim 9, wherein the transceiver is further configured to:
   signal a RNTI control message to the user device, wherein the RNTI control message comprises RNTI selection rules specifying whether the user device should use the first RNTI or the second RNTI.

13. The network node according to claim 12, wherein the RNTI selection rules for using the first RNTI or the second RNTI are dependent on one or more of the following parameters: geographic location of the user device, serving network node identity, detected neighbour network nodes, type of assigned radio communication channel, length of sleep periods in discontinuous reception, mobility for the user device, type of protocol message, type of transmission, and RNTI communication failure.

14. A method, the method comprising:
   receiving, by a user device, a first Radio Network Temporary Identifier (RNTI), wherein the first RNTI is valid for a first set of network nodes of a radio communication network, and wherein the first set of network nodes comprises at least two network nodes;
   receiving, by the user device, a second RNTI, wherein the second RNTI is valid for a second set of network nodes of the radio communication network, and wherein the second set of network nodes comprises at least two network nodes, the first set of network nodes and the second set of network nodes are different sets of network nodes, and the first set of network nodes is a subset of the second set of network nodes; and
   transmitting, by the user device, data to the radio communication network, or receiving, by the user device, data from the radio communication network, using the first RNTI or the second RNTI,
   wherein the first RNTI is used to transmit or receive the data when the user device is in a connected state and the second RNTI is used to transmit or receive the data when the user device is in a state other than the connected state, wherein in the connected state the user device is connected to at least one network node of the radio communication network, and wherein at any given moment the user device communicates using only one of the first RNTI or the second RNTI.

15. A computer program with a program code for performing the method according to claim 14 when the computer program runs on a computer.

16. A method, comprising:
   assigning, by a network node, a first Radio Network Temporary Identifier (RNTI) to a user device, wherein the first RNTI is valid for a first set of network nodes of a radio communication network;
   assigning, by the network node, a second RNTI to the user device, wherein the second RNTI is valid for a second set of network nodes of the radio communication network, and wherein the first set of network nodes and the second set of network nodes are different sets of network nodes;
   signalling, by the network node, the first RNTI to the user device; and
   signalling, by the network node, the second RNTI to the user device, wherein the first RNTI and the second RNTI are signalled to the user device in a single radio signal,
   wherein the first RNTI is used by the user device to transmit or receive data when the user device is in a connected state and the second RNTI is used by the user device to transmit or receive data when the user device is in a state other than a connected state, wherein in the connected state the user device is connected to at least one network node of the radio communication network, and wherein at any given moment the user device communicates using only one of the first RNTI or the second RNTI.

17. The method according to claim 16, wherein the first set of network nodes comprises at least two network nodes, the second set of network nodes comprises at least two network nodes, and the first set of network nodes is a subset of the second set of network nodes.

* * * * *